United States Patent
Shankar et al.

(10) Patent No.: US 10,810,051 B1
(45) Date of Patent: Oct. 20, 2020

(54) AUTOSCALING USING FILE ACCESS OR CACHE USAGE FOR CLUSTER MACHINES

(71) Applicant: Databricks Inc., San Francisco, CA (US)

(72) Inventors: Srinath Shankar, Belmont, CA (US); Eric Keng-Hao Liang, Berkeley, CA (US)

(73) Assignee: Databricks Inc., San Francisco, CA (US)

( * ) Notice: Subject to any disclaimer, the term of this patent is extended or adjusted under 35 U.S.C. 154(b) by 128 days.

(21) Appl. No.: 16/188,989

(22) Filed: Nov. 13, 2018

(51) Int. Cl.
*G06F 9/46* (2006.01)
*G06F 9/50* (2006.01)
*G06F 9/48* (2006.01)
*G06F 9/38* (2018.01)
*H04L 29/08* (2006.01)

(52) U.S. Cl.
CPC .......... *G06F 9/5077* (2013.01); *G06F 9/3891* (2013.01); *G06F 9/4856* (2013.01); *G06F 9/5027* (2013.01); *G06F 9/5088* (2013.01); *H04L 67/2852* (2013.01)

(58) Field of Classification Search
None
See application file for complete search history.

*Primary Examiner* — Gregory A Kessler
(74) *Attorney, Agent, or Firm* — Van Pelt, Yi & James LLP

(57) ABSTRACT

The allocation system comprises an interface and a processor. The interface is configured to receive an indication to deactivate idle cluster machines of a set of cluster machines. The processor is configured to determine a set of tasks executing or pending on the set of cluster machines; determine a set of idle cluster machines of the set of cluster machines that are neither running one or more tasks of the set of tasks nor storing one or more intermediate data files of a set of intermediate data files, where the set of intermediate data files is associated with a set of tasks executing or pending on the cluster machines; and deactivate each cluster machine of the set of idle cluster machines.

19 Claims, 12 Drawing Sheets

AUTOSCALING USING FILE ACCESS OR CACHE USAGE FOR CLUSTER MACHINES

BACKGROUND OF THE INVENTION

Cluster computing systems typically utilize a set of cluster machines executing tasks provided by a master system. The master system divides a job or job steps into a set of tasks, determines an appropriate cluster machine for each task, provides tasks to cluster machines, receives task results from cluster machines, and assembles task results into job step results. It is important to determine an appropriate number of cluster machines in the cluster is an important task. Cluster machines are typically easily moveable between clusters, thus, if they are assigned to a cluster and not utilized, their capacity is actively being wasted (along with the associated cost, if any). If not enough cluster machines are present in the cluster, jobs will take unnecessarily long. When a set of tasks is created for a job step, the number of tasks and thus the number of cluster machines that can be utilized is determined. If the number of cluster machines is less than the number of tasks, cluster machines can be easily added. However, removing cluster machines in the event that the number of cluster machines is greater than the number of tasks is less trivial. Cluster machines can store data for processing and intermediate result data that may be required for future processing, creating a problem wherein it is not immediately known whether a cluster machine can be safely removed from the cluster system.

BRIEF DESCRIPTION OF THE DRAWINGS

Various embodiments of the invention are disclosed in the following detailed description and the accompanying drawings.

DETAILED DESCRIPTION

Figure 1:
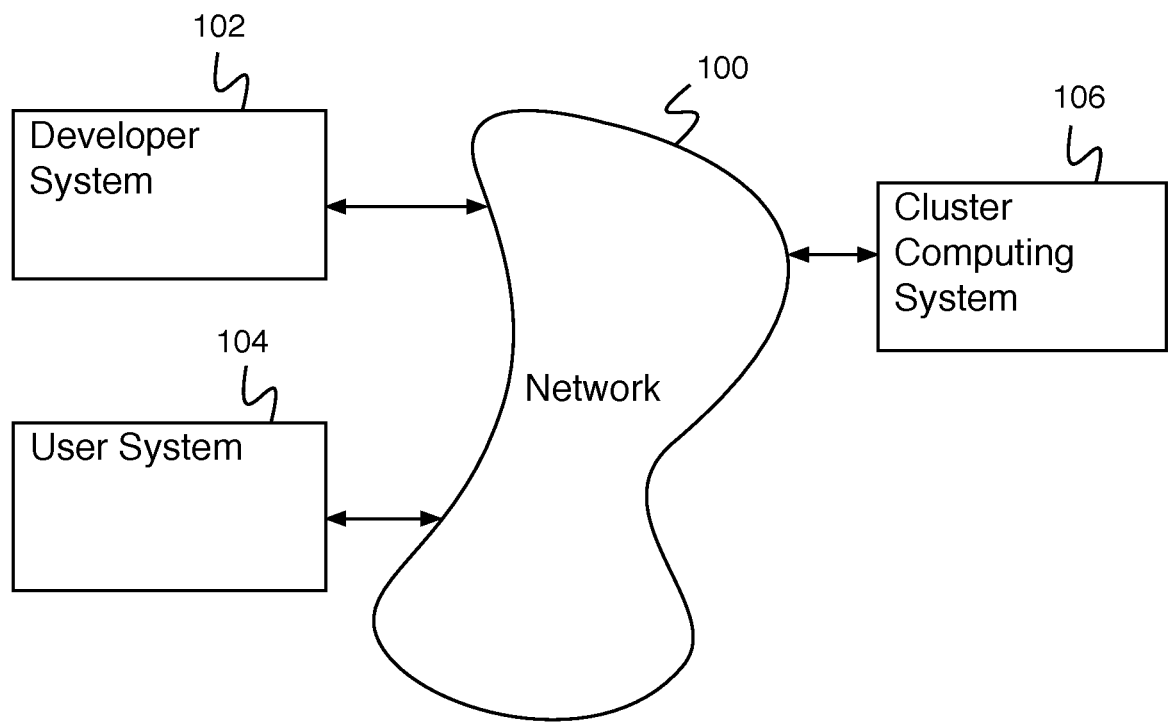
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An allocation system comprises an interface configured to receive an indication to deactivate idle cluster machines of a set of cluster machines, and a processor configured to determine a set of tasks executing or pending on the set of cluster machines, determine a set of idle cluster machines of the set of cluster machines that are neither running one or more tasks of the set of tasks nor storing one or more intermediate data files of a set of intermediate data files, wherein the set of intermediate data files is associated with the set of tasks executing or pending on the set of cluster machines, and deactivate each cluster machine of the set of idle cluster machines. The system for allocation additionally comprises a memory coupled to the processor and configured to provide the processor with instructions.

An allocation system comprises a system for interacting with a cluster system. For example, the allocation system comprises a cluster machine of the cluster system, a system executing as a sub-system of a master system of the cluster system, a system local to a user, etc. The cluster system receives and processes cluster computing jobs. A cluster computing job comprises a set of job steps that are executed sequentially (e.g., the first job step is executed by the cluster, then the second job step, then the third, etc.). Each job step is broken into a set of tasks that are executed in parallel by the cluster machines of the cluster system. The optimal number of cluster machines required comprises the same number as the number of tasks to execute for the job step (e.g., one cluster machine per task). The number of tasks per job step varies based on the job step and the data. For example, each job step for a job can require the completion of a different number of tasks, requiring a different number of cluster machines. In various embodiments, the cluster computing job is broken up into job steps and tasks in a different manner than a sequence of steps each comprising parallel tasks—for example, a job is broken into a sequence of one or more job steps that run sequentially and/or in parallel, where each job step comprises parallel and/or sequential tasks, or any appropriate combination of job steps and tasks in sequence and/or in parallel. In the event it is determined that more cluster machines are required for a job step than are allocated to the cluster, adding additional cluster machines is straightforward, only requiring them to be requested and added. In some cases, there may be a delay after the request to be added as the new machines are brought on line. In some cases, the addition of a cluster machine is constrained by a limitation (e.g., a physical limit to the number of machines, an allocated limit, etc.). In the event that a limit is reached, the user is informed of the limitation. In some embodiments, the user is not informed of the limitation. In some embodiments, in the event that a new machine is added, the user is informed of the addition of a machine assigned to the processing of the job submitted. In the event it is determined that fewer cluster machines are required for a job step than are allocated to the cluster, removing the extra cluster machines is not straightforward. During execution of a task, a cluster machine generates a set of intermediate data files. The intermediate data files can be required for execution of a later job step. The cluster system typically would not remove any idle cluster machines during execution of a job in order to preserve the intermediate data files, wasting cluster capacity and unnecessarily increasing the cost of executing the job. In various cases, the intermediate data files are needed later in the processing or the intermediate data files are not needed later in the processing.

The allocation system comprises a system for receiving an indication to deactivate idle cluster machines of a set of cluster machines. For example, when a job transitions to a new job step, an indication to deactivate idle cluster machines is provided to the allocation system to deactivate cluster machines used in a previous job step and no longer required. The allocation system determines a set of tasks executing or pending (e.g., executing now or scheduled or indicated to be executed) on the set of cluster machines (e.g., the set of tasks for the job step). Determining the set of tasks comprises determining the set of cluster machines executing or pending one or more tasks of the set of tasks (e.g., the set of cluster machines that are actively processing the job step). The allocation system additionally determines a set of cluster machines storing one or more intermediate data files of a set of intermediate data files. The set of intermediate data files is associated with a set of tasks executing or pending on the cluster machines. Intermediate files are created by a process that is starting to execute, currently executing, finishing executing, and/or finished executing. Certain tasks of the set of tasks generate the intermediate data files that are stored on the cluster machines. Once the set of cluster machines executing one or more tasks of the set of tasks and the set of cluster machines storing one or more intermediate data files (e.g., data files that are associated with executing or pending tasks) of the set of data files are determined, a set of idle cluster machines of the set of cluster machines can be determined. The set of idle cluster machines of the set of cluster machines comprises cluster machines that are neither running one or more tasks of the set of tasks nor storing one or more intermediate data files of the set of intermediate data files (e.g., one or more intermediate data files that are needed currently or later in the processing, one or more intermediate data files that are still existing after the process that created them is no longer executing, etc.). The allocation system then deactivates each cluster machine of the set of idle cluster machines. In some embodiments, the allocation system is additionally configured to cause a task transfer of a portion of the set of tasks from a first cluster machine to a second cluster machine in order to increase a number of idle cluster machines, or to cause a file transfer of a group of intermediate data files from a first cluster machine to a second cluster machine in order to increase a number of idle cluster machines. The allocation system improves the computing system by minimizing the number of cluster machines allocated to the cluster without losing intermediate data files stored by cluster machines from a previous job step. In some cases, intermediate data files are needed again. In some cases, intermediate data files are not needed again.

The allocation system makes a computer system more efficient as the system uses fewer resources in executing a job. Specifically, the allocation system is able to identify, appropriately, cluster machines that are not running tasks and/or storing intermediate files. In some cases, cluster machines move one or more tasks and/or one or more stored intermediate files to also create more idle cluster machines. The system can deallocate idle machines to save resources—for example, processing resources and storage space.

FIG. 1 is a block diagram illustrating an embodiment of a network system. In some embodiments, the network system of FIG. 1 comprises a system for allocation. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Developer system 102, user system 104, and cluster computing system 106 communicate via network 100. In the example shown, developer system 102 comprises a developer system for use by a developer. For example, a developer uses a developer system to interact with a development environment including a user interface to develop code. A developer system includes code compilation and execution tools. For example, the developer system performs an interactive code execution (e.g., a read evaluate print loop) and query analysis. Cluster computing system 106 comprises a remote system for developing, compiling and executing code. For example, a developer (e.g., a developer using a developer system or any other system) remotely accesses server system 106 to develop, compile, and execute code. A user (e.g., a user using a user system or any other system) remotely accesses cluster computing system 106 to execute code developed by a developer. Cluster computing system 106 comprises an allocation system for autoscaling using file access or cache usage. For example, cluster computing system 106 comprises a system for increasing or decreasing a cluster size based on cluster usage (e.g., activating new cluster machines or deactivating idle cluster machines). Cluster computing system 106 executes cluster computing jobs—for example, comprising a sequential set of job steps. Each job step requires a different number of cluster machines that depends on the data set, the job step parallelization, etc. The system for increasing or decreasing a cluster size based on cluster usage increases or decreases a cluster size based on cluster usage such that it is possible for an optimal number of cluster machines to be active for each job step and/or task of the job. An allocation system for autoscaling using file access or cache usage comprises an interface configured to receive an indication to deactivate idle cluster machines of a set of cluster machines (e.g., in the event it is determined that there are more cluster machines in the cluster than required by the job step). The allocation system additionally comprises a processor configured to determine a set of tasks executing or pending on the set of cluster machines, determine a set of idle cluster machines of the set of cluster machines that are neither running one or more tasks of the set of tasks nor storing one or more intermediate data files of a set of intermediate data files, wherein the set of intermediate data files is associated with the set of tasks executing or pending on the set of cluster machines, and deactivate each cluster machine of the set of idle cluster machines.

Figure 2:
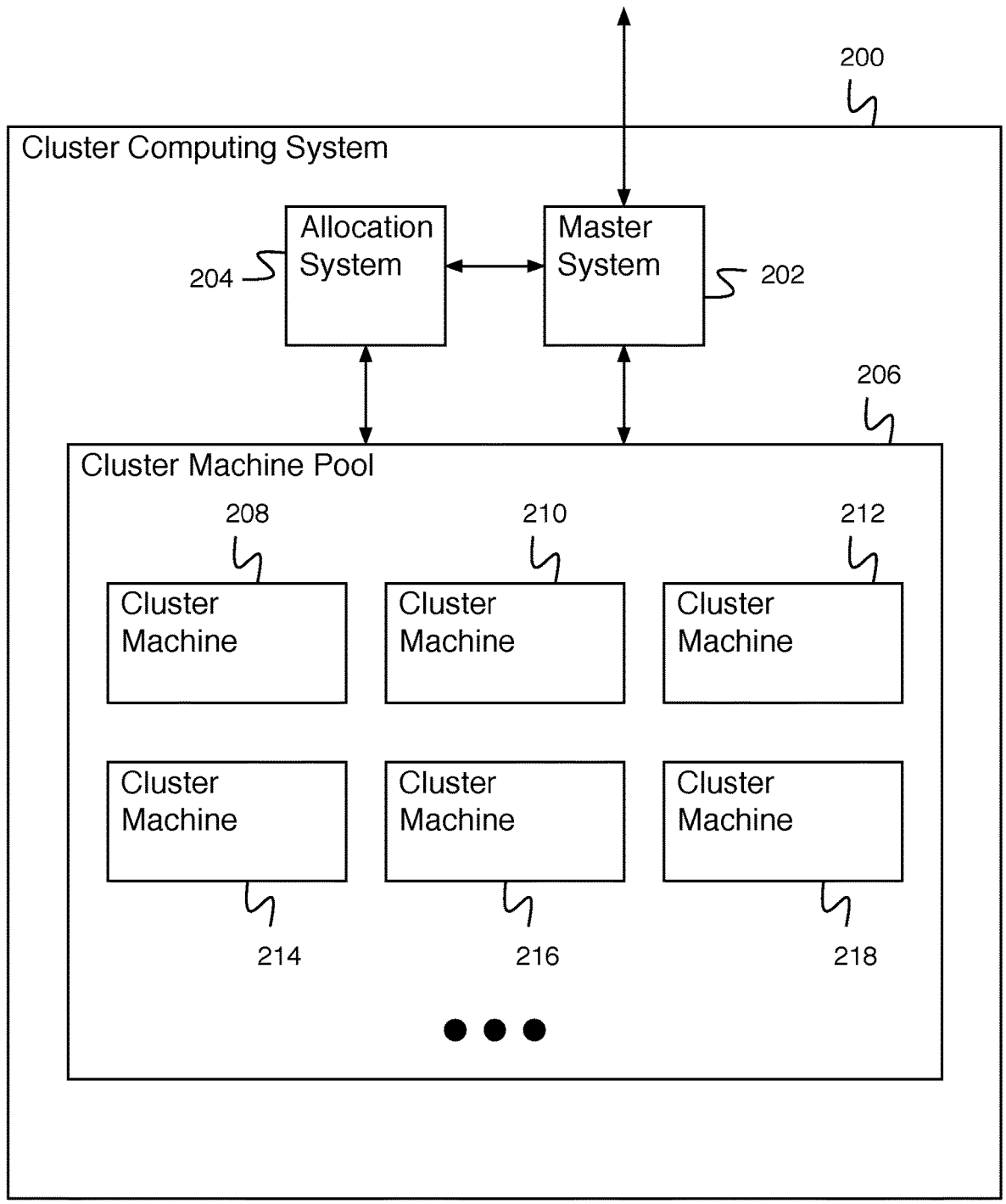
FIG. 2 is a block diagram illustrating an embodiment of a cluster computing system.

FIG. 2 is a block diagram illustrating an embodiment of a cluster computing system. In some embodiments, cluster computing system 200 comprises cluster computing system 106 of FIG. 1. In the example shown, cluster computing system 200 comprises master system 202. Master system 202 comprises a system for receiving a job request (e.g., via a network, from a developer system, from a user system, etc.), determining a set of job steps for a job, determining a set of tasks for a job step, providing tasks to cluster machines (e.g., cluster machines of cluster machine pool 206), receiving task results from cluster machines, assembling task results into job step results (or any other combination of assembling results from jobs and/or tasks), determining job results, providing job results, etc. Master system 202 additionally comprises a system for determining whether cluster machine pool 206 comprises enough cluster machines, requires more cluster machines than are currently allocated to it, or requires fewer cluster machines than are currently allocated to it. In some embodiments, master system 202 comprises a first cluster machine of cluster machine pool 206. In the event master system 202 determines that cluster machine pool 206 requires more cluster machines than are currently allocated to it, master system 202 provides an indication to cluster machine pool 206 to add cluster machines, and cluster machine pool 206 adds the appropriate number of cluster machines. In the event master system 202 determines that cluster machine pool 206 requires fewer cluster machines than are currently allocated to it, master system 202 provides an indication to allocation system 204 to deactivate idle cluster machines of cluster machine pool 206. Allocation system 204 comprises a system for receiving an indication to deactivate idle cluster machines of a set of cluster machines, determining a set of tasks running on the set of cluster machines, determining a set of tasks executing or pending on the set of cluster machines, determining a set of idle cluster machines of the set of cluster machines that are neither running one or more tasks of the set of tasks nor storing one or more intermediate data files of a set of intermediate data files, wherein the set of intermediate data files is associated with a set of tasks executing or pending on the set of cluster machines, and deactivating each cluster machine of the set of idle cluster machines. In some cases, the one or more intermediate data files comprise one or more intermediate data files that are necessary for later processing. In some cases, the one or more intermediate data files comprise one or more intermediate data files that are not necessary for later processing. For example, allocation system 204 comprises a cluster machine (e.g., part of cluster machine pool 206), a subsystem of master system 202, a local system (e.g., local to a user or a developer), a system not local to a cluster user system, a part of a cloud-based system, or any other appropriate system. In some embodiments, allocation system 204 comprises a second cluster machine of cluster machine pool 206. Cluster machine pool 206 comprises a set of cluster machines (e.g., cluster machine 208, cluster machine 210, cluster machine 212, cluster machine 214, cluster machine 216, and cluster machine 218). Cluster machine pool 206 comprises any appropriate number of cluster machines (e.g., 2 cluster machines, 6 cluster machines, 25 cluster machines, 100 cluster machines, etc.). Cluster machines of cluster machine pool 206 comprise physical machines, virtual machines, local machines, cloud-based machines, etc. In some embodiments, allocation system 204 comprises cluster machine pool 206.

Figure 3:
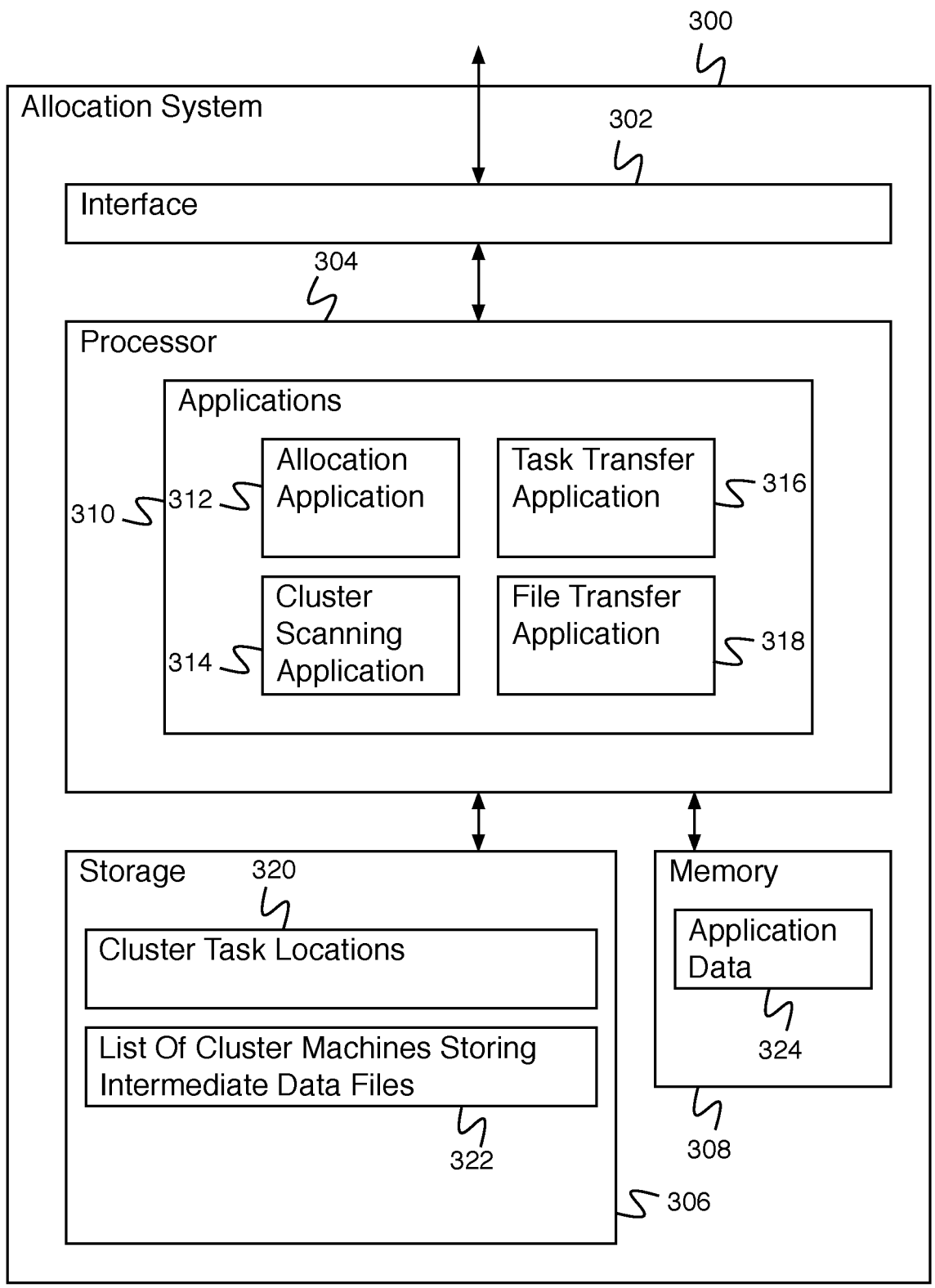
FIG. 3 is a block diagram illustrating an embodiment of an allocation system.

FIG. 3 is a block diagram illustrating an embodiment of an allocation system. For example, allocation system 300 of FIG. 3 comprises allocation system 204 of FIG. 2. In the example shown, allocation system 300 comprises interface 302, processor 304, storage 306, and memory 308. Interface 302 comprises an interface system for communicating with other systems via a network. For example, interface 302 comprises an interface for receiving an indication to deactivate idle cluster machines of a set of cluster machines, interacting with a cluster system to determine a set of idle cluster machines, providing an indication to deactivate idle cluster machines, etc. Processor 304 comprises a processor for executing applications 310. Applications 310 comprises allocation application 312. Allocation application 312 comprises an application for determining a set of tasks running on the set of cluster machines, determining a set of idle cluster machines that are neither running one or more tasks of the set of tasks nor storing one or more intermediate data files of a set of intermediate data files, wherein the set of intermediate data files is associated with a set of tasks executing or pending on the cluster machines, and deactivating each cluster machine of the set of idle cluster machines. Applications 310 additionally comprises cluster scanning application 312 (e.g., for scanning cluster machines of a cluster for active tasks or intermediate data files), task transfer application 316 (e.g., for causing a task transfer of a portion of the set of tasks from a first cluster machine to a second cluster machine in order to increase a number of idle cluster machines), file transfer application 318 (e.g., for causing a file transfer of a group of intermediate data files from a first cluster machine to a second cluster machine in order to increase a number of idle cluster machines), as well as any other appropriate user and/or system applications. Storage 306 comprises cluster task locations 320 (e.g., data storage storing an indication of cluster machines of a cluster running tasks for a job step) and list of cluster machines storing intermediate data files 322 (e.g., a list of cluster machines of a cluster storing intermediate data files for a job). Memory 308 comprises application data 324.

Figure 4:
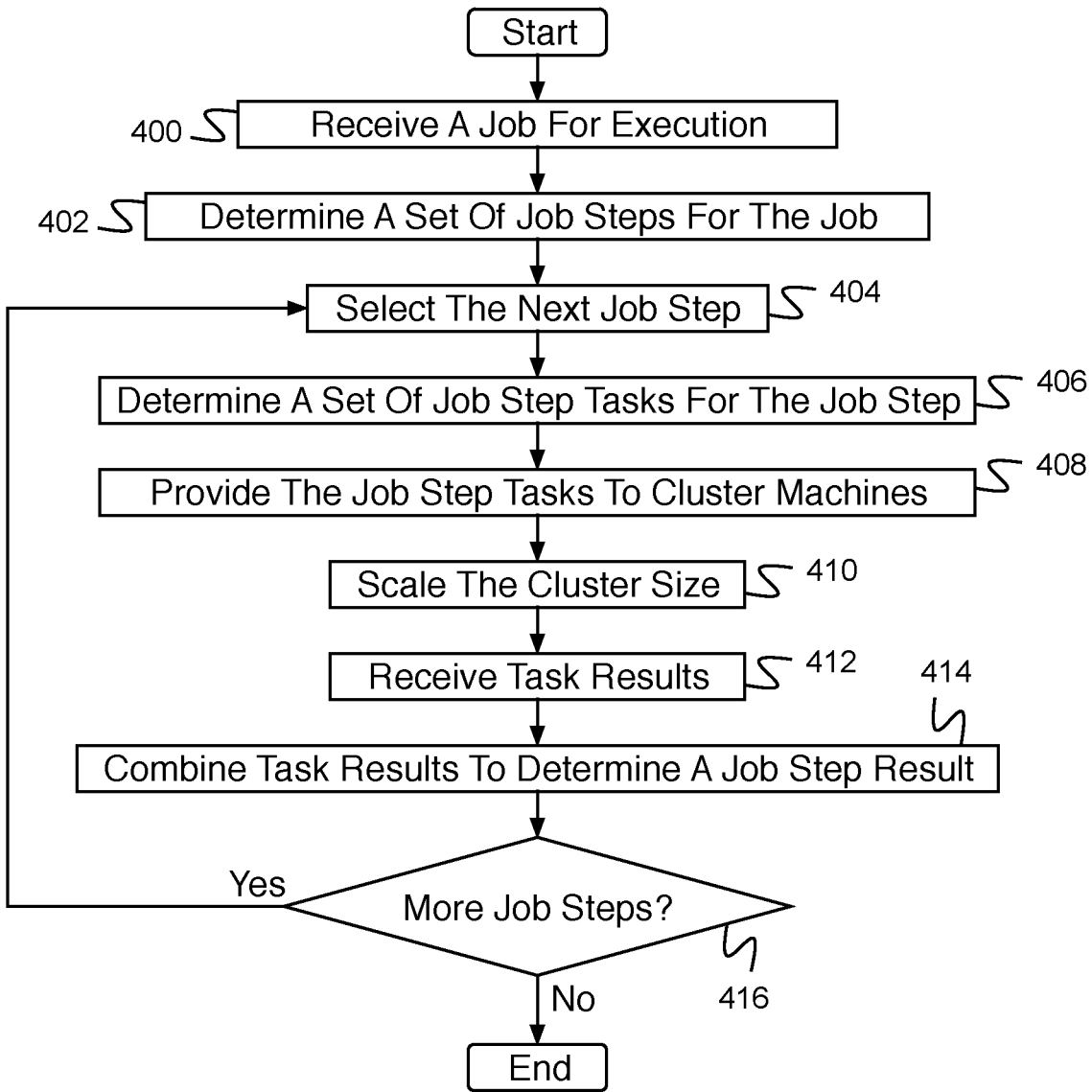
FIG. 4 is a flow diagram illustrating an embodiment of a process for executing a job.

FIG. 4 is a flow diagram illustrating an embodiment of a process for executing a job. In some embodiments, the process of FIG. 4 is executed by a master system of a cluster computing system (e.g., cluster computing system 106 of FIG. 1). In the example shown, in 400, a job is received for execution. For example, a job is received from a developer or a user. In 402, a set of job steps for the job is determined. The set of job steps comprises a sequential set of steps the execution of which comprises execution of the job. In 404, the next job step is selected. In some embodiments, the next job step comprises the first job step. In 406, a set of job step tasks for the job step is determined. The set of job step tasks comprises a set of tasks that are executed in parallel to execute the job step. In 408, the job step tasks are provided to cluster machines. In some embodiments, the job steps and/or tasks are submitted to cluster machines in a combination of sequential and parallel units that are determined for the job. In 410, the cluster size is scaled. For example, the cluster size is increased in the event there are more job step tasks than cluster machines and reduced in the event there are fewer job step tasks than cluster machines. A process for reducing cluster size in the event there are fewer job step tasks than cluster machines comprises an allocation process performed by an allocation system. For example, an allocation process comprises receiving an indication to deactivate idle cluster machines of a set of cluster machines, determining a set of tasks running on the set of cluster machines, determining a set of idle cluster machines that are neither running one or more tasks of the set of tasks nor storing one or more intermediate data files of a set of intermediate data files, wherein the set of intermediate data files is associated with a set of tasks executing or pending, and deactivating each cluster machine of the set of idle cluster machines. In 412, task results are received (e.g., from the cluster machines). In 414, task results are combined to determine a job step result. In 416, it is determined whether there are more job steps (e.g., of the set of job steps for the job). In the event it is determined that there are more job steps, control passes to 404. In the event it is determined that there are not more job steps, the process ends.

Figure 5:
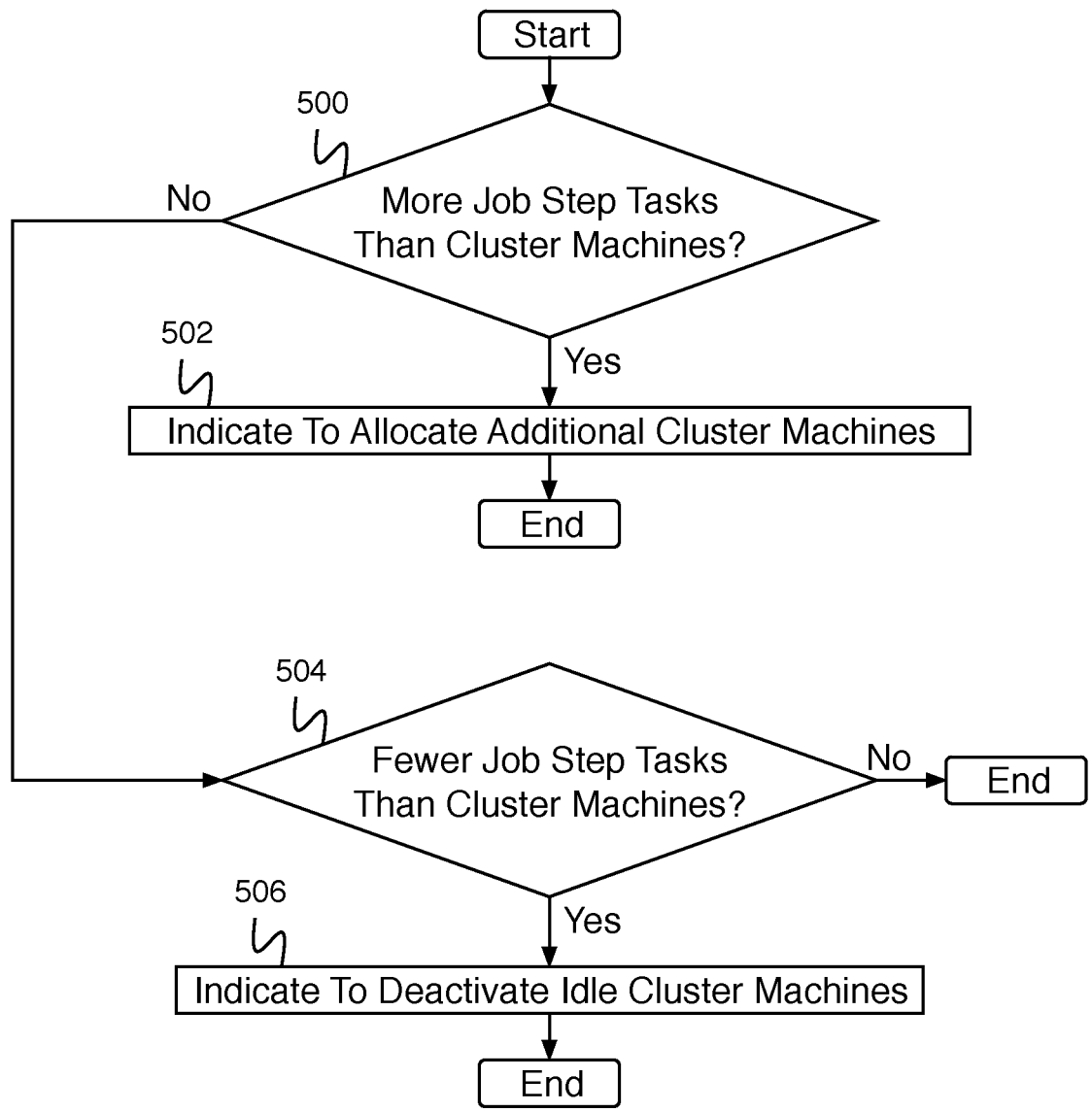
FIG. 5 is a flow diagram illustrating an embodiment of a process for scaling a cluster size.

FIG. 5 is a flow diagram illustrating an embodiment of a process for scaling a cluster size. In some embodiments, the process of FIG. 5 implements 408 of FIG. 4. In the example shown, in 500, the process determines whether there are more job step tasks than cluster machines. In the event it is determined that there are not more job step tasks than cluster machines, control passes to 504. In the event it is determined that there are more job step tasks than cluster machines, control passes to 502. In 502, the process indicates to allocate additional cluster machines, and the process ends. In 504, the process determines whether there are fewer job step tasks than cluster machines. In the event it is determined that there are not fewer job step tasks than cluster machines, the process ends. In the event it is determined that there are fewer job step tasks than cluster machines, control passes to 506. In 506, the process indicates to deactivate idle cluster machines. For example, a process for deactivating idle cluster machines is executed by an allocation system.

Figure 6:
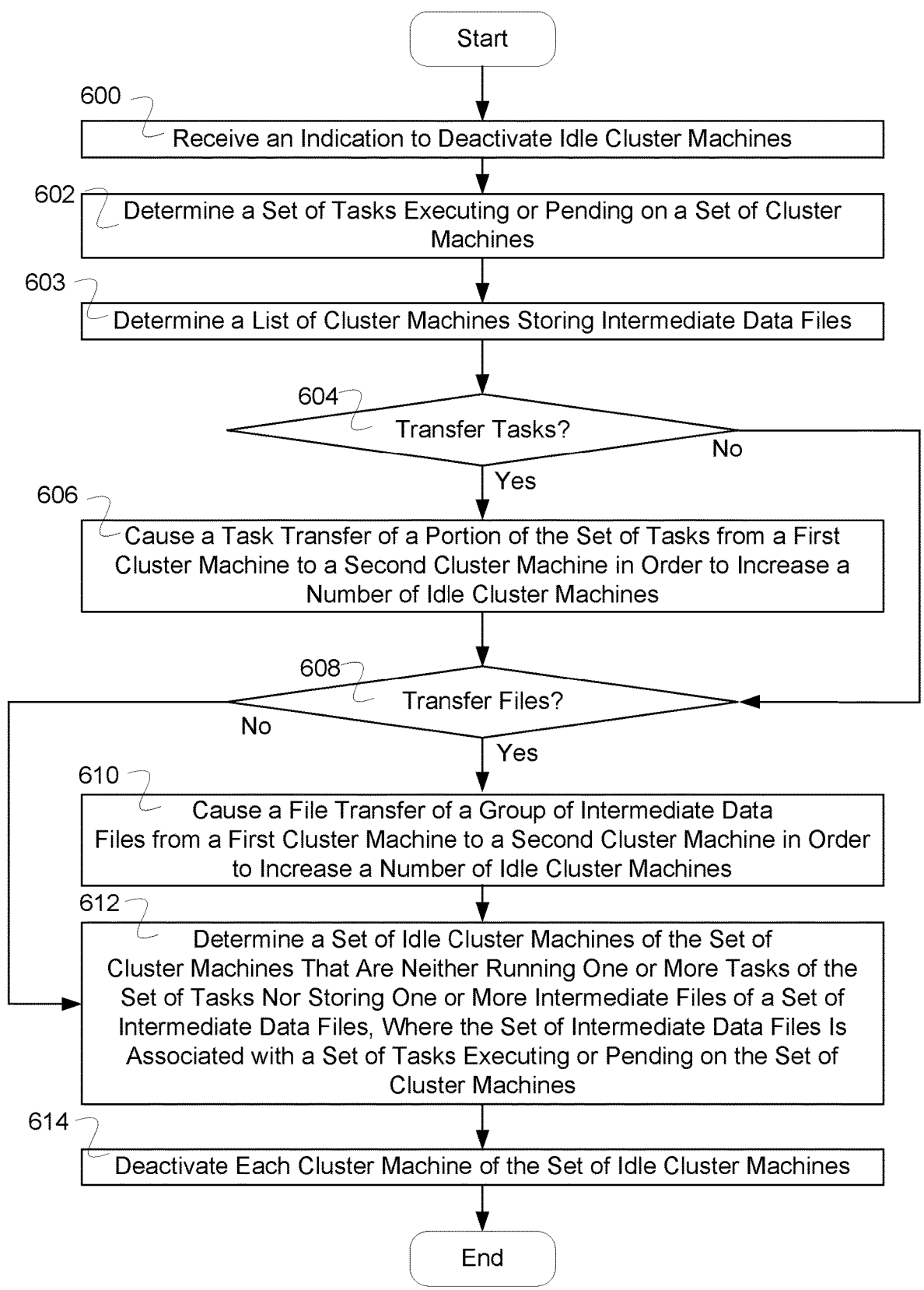
FIG. 6 is a flow diagram illustrating an embodiment of a process for deactivating idle cluster machines.

FIG. 6 is a flow diagram illustrating an embodiment of a process for deactivating idle cluster machines. In some embodiments, the process of FIG. 6 is executed by an allocation system (e.g., allocation system 300 of FIG. 3). In the example shown, in 600, an indication to deactivate idle cluster machines is received. In 602, a set of tasks executing or pending on the set of cluster machines is determined. For example, determining the set of tasks executing or pending on the set of cluster machines comprises providing a query to a master cluster machine for the set of tasks executing or pending on the set of cluster machines, and receiving the set of tasks executing or pending on the set of cluster machines from the master cluster machine. In 603, a list of cluster machines storing intermediate data files is determined. In 604, it is determined whether to transfer tasks. For example, it is determined whether to transfer tasks based at least in part on a number of tasks, on a number of cluster machines, on a cluster machine processor usage, on a task transfer policy, etc. In some embodiments, it is determined to combine two tasks onto a single cluster machine in the event that their combined processor usage is less than the maximum processor capability of a cluster machine. In the event it is not determined to transfer tasks, control passes to 608. In the event it is determined to transfer tasks, control passes to 606. In 606, a task transfer of a portion of the set of tasks from a first cluster machine to a second cluster machine is caused in order to increase a number of idle cluster machines. Control then passes to 608. In 608, it is determined whether to transfer files. For example, it is determined whether to transfer files based at least in part on a set of machines storing tasks, on machine available storage, on a total size of files stored, on a file transfer policy, etc. In some embodiments, it is determined to transfer files in order to combine the files onto a minimum number of cluster machines. In the event it is determined not to transfer files, control passes to 612. In the event it is determined to transfer tasks, control passes to 610. In 610, a file transfer of a group of intermediate data files is caused from a first cluster machine to a second cluster machine in order to increase a number of idle cluster machines. Control then passes to 612. In 612, a set of idle cluster machines of the set of cluster machines that are neither running one or more tasks of the set of tasks not storing one or more intermediate data files of a set of intermediate data files is determined, wherein the set of intermediate data files is associated with a set of tasks executing or pending on the set of cluster machines. In 614, each cluster machine of the set of idle cluster machines is deactivated.

Figure 7:
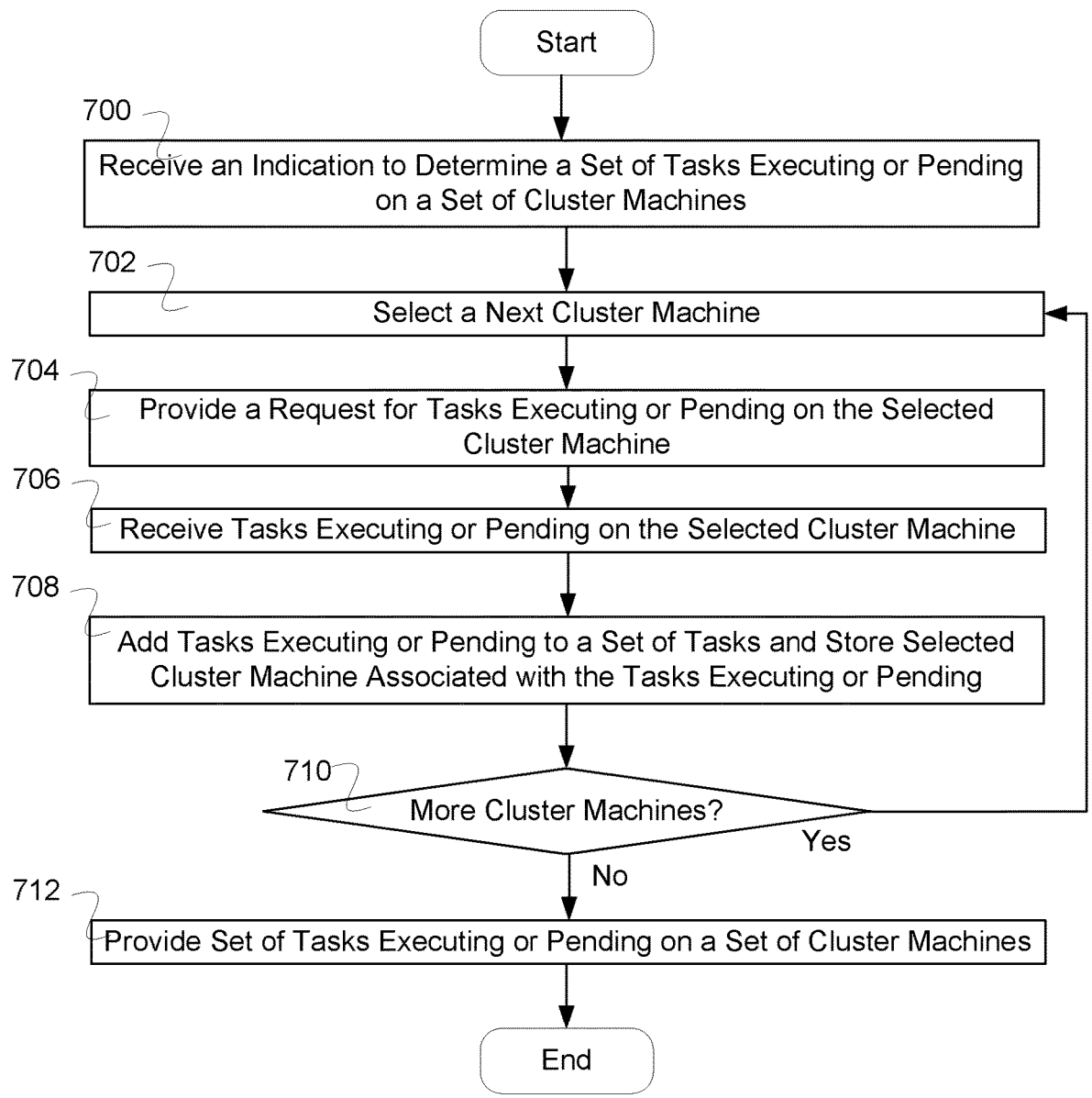
FIG. 7 is a flow diagram illustrating an embodiment of a process for determining a set of tasks running on a set of cluster machines.

FIG. 7 is a flow diagram illustrating an embodiment of a process for determining a set of tasks executing or pending on a set of cluster machines. In some embodiments, the process of FIG. 7 is used to implement 602 of FIG. 6. In the example shown, in 700 an indication is received to determine a set of tasks executing or pending on a set of cluster machines. In 702, a next cluster machine is selected. In 704, a request is provided for tasks executing or pending on the selected cluster machine. For example, the allocation system provides a request to the selected cluster machine for the tasks executing or pending on the cluster machine. In 706, the tasks executing or pending on the selected cluster machine are received. In 708, the tasks executing or pending are added to a set of tasks and the selected cluster machine is stored associated with the tasks executing or pending. In 710, it is determined whether there are more cluster machines. In response to it being determined that there are more cluster machines, control passes to 702. In response to it being determined that there are not more cluster machines, in 712 a set of tasks running on a set of cluster machines are provided.

Figure 8:
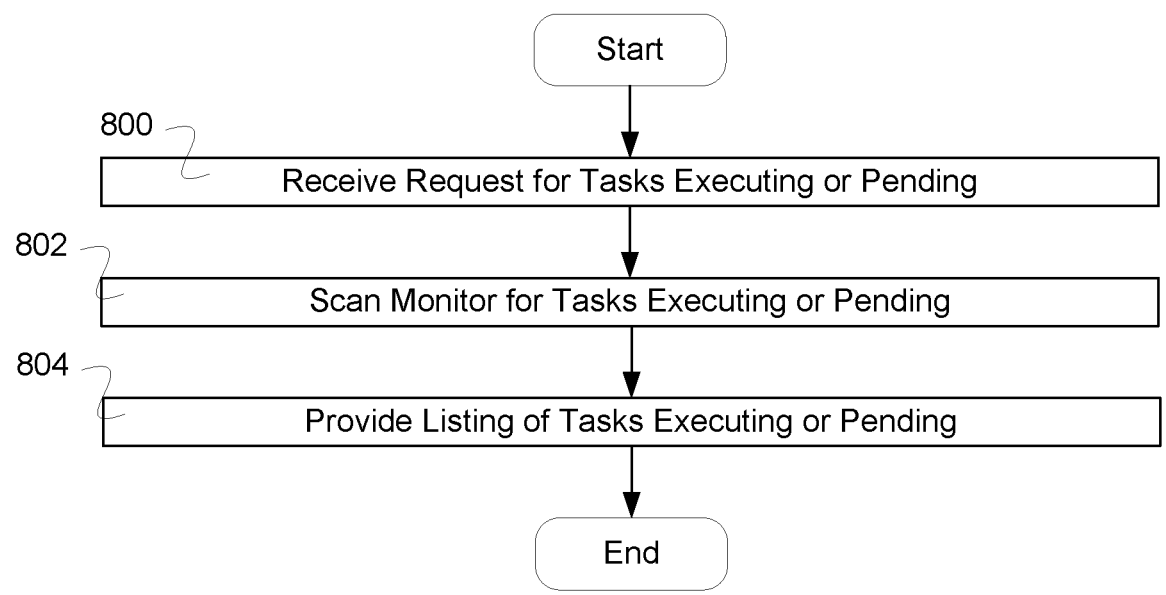
FIG. 8 is a flow diagram illustrating an embodiment of a process for determining tasks running on a selected cluster machine.

FIG. 8 is a flow diagram illustrating an embodiment of a process for determining tasks executing or pending on a selected cluster machine. In some embodiments, the process of FIG. 8 is used to respond to the request of 704 in FIG. 7. In the example shown, in 800 a request is received for tasks executing or pending. For example, a cluster machine receives a request to determine tasks executing or pending. In 802, a monitor is scanned for tasks executing or pending. For example, the scheduler for the cluster machine scans through to determine the tasks executing or pending on the cluster machine. For example, dataframe/SQL are submitted by users. These are broken up by a query analyzer/planner into jobs, stages, and/or tasks. Alternatively, users can submit resilient distributed datasets (RDDs), which are broken up into stages and/or tasks. These jobs, stage, and/or tasks are submitted to the scheduler, which keeps track of what is pending (e.g., by creating and maintaining lists of executing and/or pending jobs, stages, and/or tasks; and/or creating one or more queues for the jobs, stages, and/or tasks). A task can move into pending state if an executor is available to run the task and after it is done, it is no longer pending. The scheduler keeps track of this information. The scheduler can be queried or appropriate logs created by the scheduler can be scanned to determine executing or pending tasks. In 804, a listing of tasks executing or pending is provided.

Figure 9:
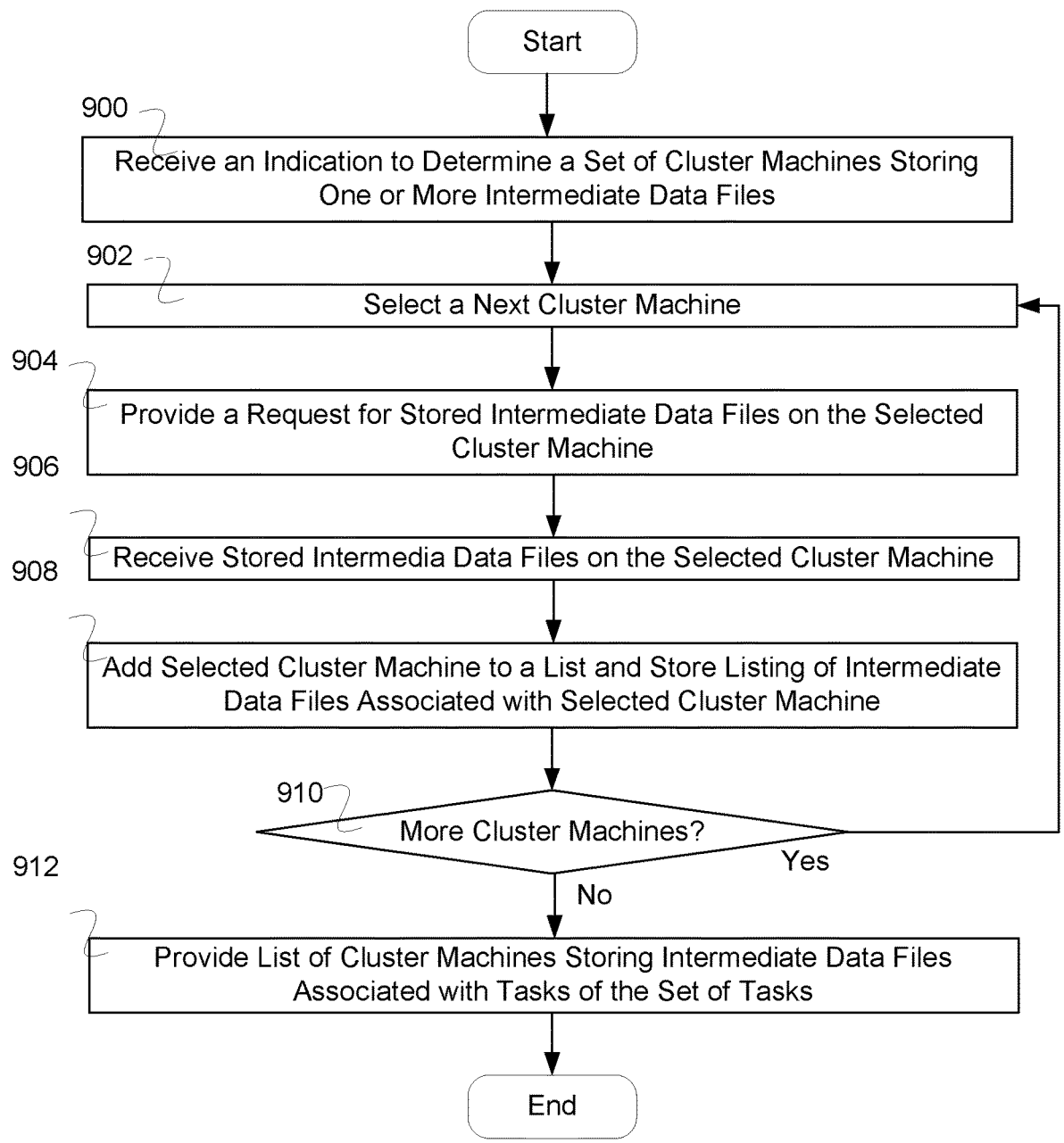
FIG. 9 is a flow diagram illustrating an embodiment of a process for determining a set of cluster machines storing one or more intermediate data files.

FIG. 9 is a flow diagram illustrating an embodiment of a process for determining a set of cluster machines storing one or more intermediate data files. In some embodiments, the process of FIG. 9 is used to implement 603 of FIG. 6. In the example shown, in 900 an indication is received to determine a set of cluster machines storing one or more intermediate data files. In 902, a next cluster machine is selected. In 904, a request is provided for stored intermediate data files on the selected cluster machine. In 906, stored intermediate data files on the selected cluster machine are received. In 908, a selected cluster machine is added to a list and a listing of intermediate data files is stored associated with the selected cluster machine. In 910, it is determined whether there are more cluster machines. In response to a determination that there are more cluster machines, control passes to 902. In response to a determination that there are not more cluster machines, in 912 a list of cluster machines storing intermediate data files associated with tasks of the set of tasks is provided, and the process ends.

Figure 10:
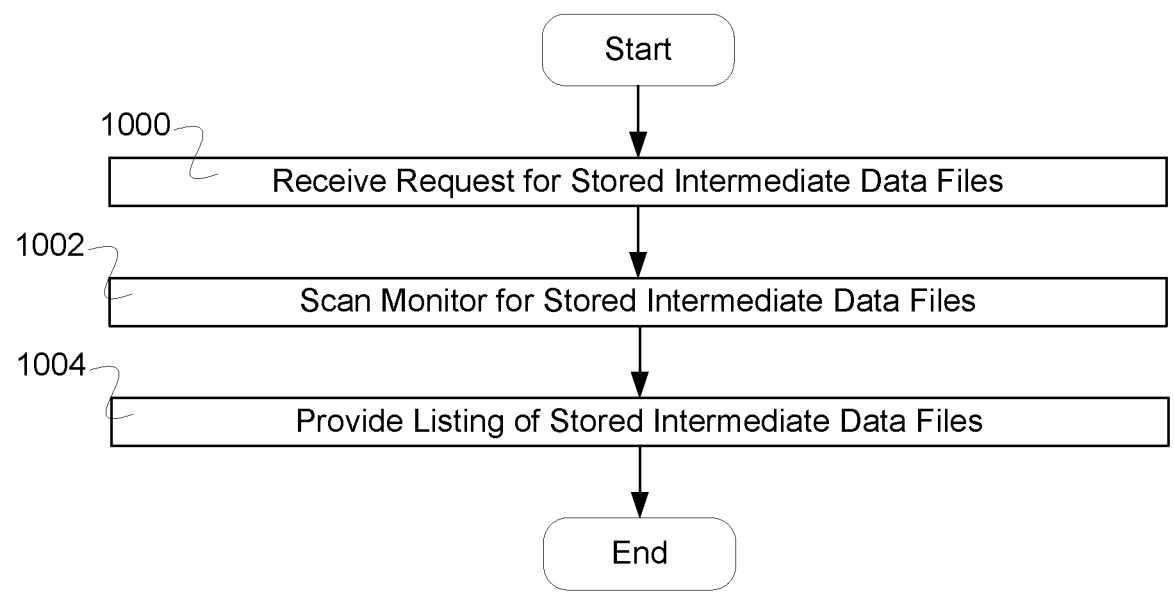
FIG. 10 is a flow diagram illustrating an embodiment of a process for determining tasks running on a selected cluster machine.

FIG. 10 is a flow diagram illustrating an embodiment of a process for determining tasks running on a selected cluster machine. In some embodiments, the process of FIG. 10 is used to respond to the request of 904 in FIG. 9. In the example shown, in 1000 a request is received for stored intermediate data files. For example, a cluster machine receives a request to determine stored intermediate data files. In 1002, a monitor is scanned for stored intermediate data files. For example, the memory (e.g., disk memory, cache memory, active memory, etc.) for the cluster machine is scanned through to determine the stored intermediate data files (e.g., arrays, files, tables, etc.) on the cluster machine. When a data file (e.g., a shuffle file) is generated on a machine, the machine reports back to scheduler as to the location of the file. The scheduler uses this to schedule new tasks and also to report back to the cluster manager. The scheduler can be queried or log files of the scheduler can be scanned to indicate data files that are being used by executing or pending tasks. In some embodiments, files dependencies of current and pending jobs can be determined by querying the scheduler or scanning its log files. A query/RDD is broken up into jobs, stages, and/or tasks. Within a job, the output of one stage is consumed as input by another stage. Since the scheduler knows which stages are running tasks, and which are pending, the scheduler knows which files are still required and which files are no longer required. In 804, a listing of stored intermediate data files is provided.

Figure 11:
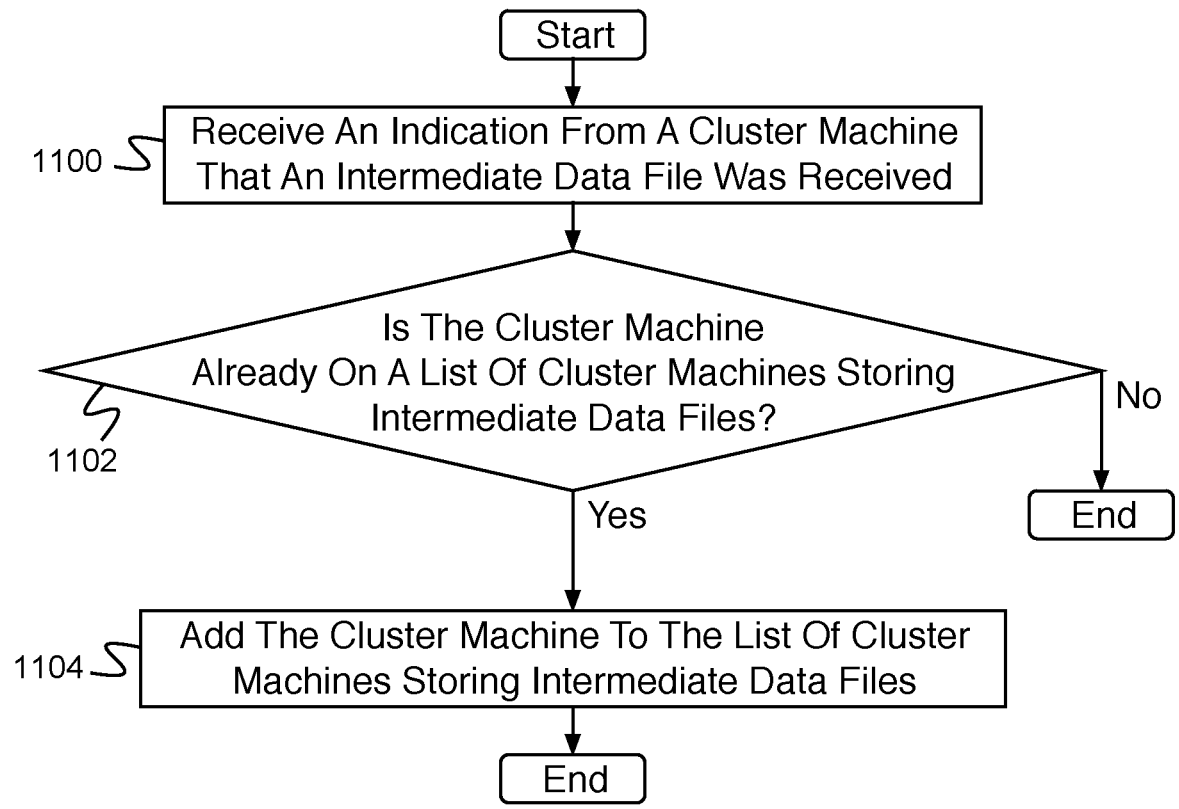
FIG. 11 is a flow diagram illustrating an embodiment of a process for building a list of cluster machines storing intermediate data files.

FIG. 11 is a flow diagram illustrating an embodiment of a process for building a list of cluster machines storing intermediate data files. In some embodiments, the process of FIG. 11 is executed by an allocation system (e.g., allocation system 300 of FIG. 3) to provide real-time updating of the list of cluster machines storing intermediate data files. In the example shown, in 1100, an indication is received from a cluster machine that an intermediate data file was received or stored. In 1102, it is determined whether the cluster machine is already on a list of cluster machines storing intermediate data files. In response to a determination that the cluster machine is already on a list of cluster machines storing intermediate data files, the process ends. In response to a determination that the cluster machine is not already on a list of cluster machines storing intermediate data files, control passes to 1104. In 1104, the cluster machine is added to the list of cluster machines storing intermediate data files. In some embodiments, determining a set of cluster machines that are not storing one or more intermediate data files of a set of intermediate data files uses the list of cluster machines storing intermediate data files.

Figure 12:
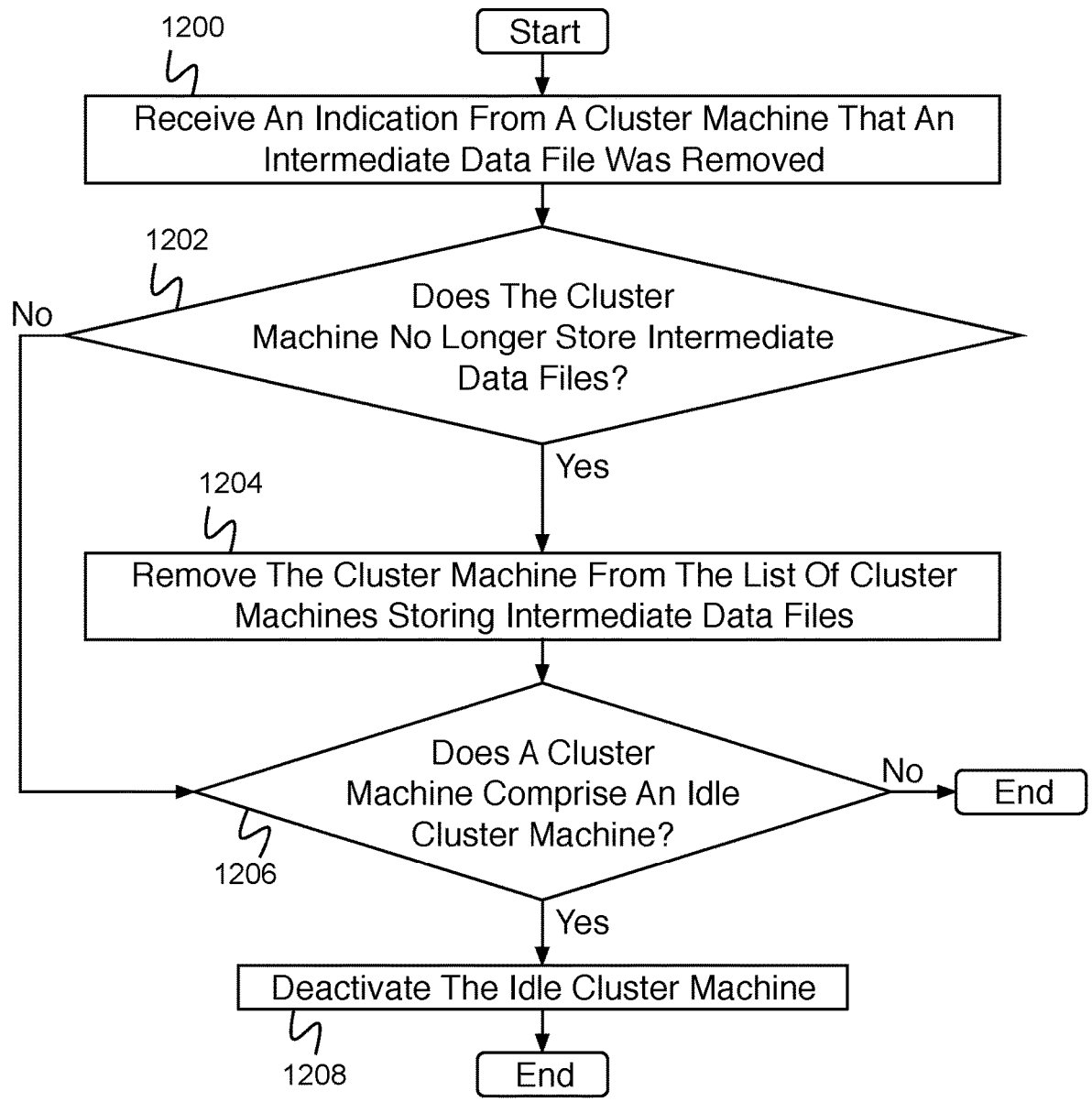
FIG. 12 is a flow diagram illustrating an embodiment of a process for maintaining a list of cluster machines storing intermediate data files.

FIG. 12 is a flow diagram illustrating an embodiment of a process for maintaining a list of cluster machines storing intermediate data files. In some embodiments, the process of FIG. 12 is executed by an allocation system (e.g., allocation system 300 of FIG. 3) to provide real-time updating of the list of cluster machines storing intermediate data files. In the example shown, in 1200, an indication is received from a cluster machine that an intermediate data file was removed. In 1202, the process determines whether the cluster machine no longer stores intermediate data files. In the event it is determined that the cluster machine still stores intermediate data files, control passes to 1206. In the event it is determined that the cluster machine no longer stores intermediate data files, control passes to 1204. In 1204, the cluster machine is removed from the list of cluster machines storing intermediate data files. Control then passes to 1206. In 1206, it is determined whether a cluster machine comprises an idle cluster machine. In the event it is not determined that a cluster machine comprises an idle cluster machine, the process ends. In the event it is determined that a cluster machine comprises an idle cluster machine, control passes to 1208. In 1208, the idle cluster machine is deactivated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An allocation system, comprising:
an interface configured to receive an indication to deactivate idle cluster machines of a set of cluster machines; and
a processor configured to:
determine a set of tasks executing or pending on the set of cluster machines;
determine a set of idle cluster machines of the set of cluster machines, wherein the set of idle cluster machines comprises all cluster machines of the set of cluster machines that are neither running one or more tasks of the set of tasks nor storing one or more intermediate data files of a set of intermediate data files, wherein the set of intermediate data files is associated with set of tasks executing or pending on the set of cluster machines; and
deactivate each cluster machine of the set of idle cluster machines.

2. The allocation system of claim 1, wherein the cluster machines comprise virtual cluster machines.

3. The allocation system of claim 1, wherein the cluster machines comprise physical cluster machines.

4. The allocation system of claim 1, wherein the processor is further configured to cause a task transfer of a portion of the set of tasks from a first cluster machine to a second cluster machine in order to increase a number of idle cluster machines.

5. The allocation system of claim 1, wherein the processor is further configured to cause a file transfer of a group of intermediate data files from a first cluster machine to a second cluster machine in order to increase a number of idle cluster machines.

6. The allocation system of claim 1, wherein the processor is further configured to:
receive an indication from a cluster machine that an intermediate data file was created; and
add the cluster machine to a list of cluster machines storing intermediate data files in the event that the cluster machine is not already on the list.

7. The allocation system of claim 6, wherein determining a set of cluster machines that are not storing the one or more intermediate data files of the set of intermediate data files uses the list of cluster machines storing intermediate data files.

8. The allocation system of claim 6, wherein the processor is further configured to:
- receive an indication from the cluster machine that the intermediate data file was removed;
- remove the cluster machine from the list of cluster machines storing intermediate data files in the event that the cluster machine no longer stores intermediate data files; and
- in response to a determination that a cluster machine comprises an idle cluster machine in response to the removal of the intermediate data file:
  - deactivate the idle cluster machine.

9. The allocation system of claim 1, further comprising the set of cluster machines.

10. The allocation system of claim 1, wherein a first cluster machine of the set of cluster machines comprises a master cluster machine.

11. The allocation system of claim 10, wherein the allocation system comprises a second cluster machine of the set of cluster machines.

12. The allocation system of claim 1, wherein the allocation system comprises a system not local to a cluster user system.

13. The allocation system of claim 1, wherein the allocation system comprises a system local to a cluster user system.

14. The allocation system of claim 1, wherein the allocation system is part of a cloud-based system.

15. The allocation system of claim 1, wherein the processor is further configured to determine the set of tasks running on the set of cluster machines, comprising:
- providing a query to a master cluster machine for the set of tasks executing or pending on the set of cluster machines; and
- receiving the set of tasks executing or pending on the set of cluster machines from the master cluster machine.

16. The allocation system of claim 1, wherein the processor is further configured to determine a list of cluster machines storing the one or more intermediate data files of the set of intermediate data files, comprising:
- querying data storage associated with each cluster machine of the set of cluster machines; and
- creating a list of cluster machines storing intermediate data files associated with tasks of the set of tasks.

17. The allocation system of claim 1, wherein the list of cluster machines is filtered for intermediate data files that are need for later processing.

18. A method for allocation, comprising:
- receiving an indication to deactivate idle cluster machines of a set of cluster machines; and
- determining, using a processor, a set of tasks executing or pending on the set of cluster machines;
- determining a set of idle cluster machines of the set of cluster machines, wherein the set of idle cluster machines comprises all cluster machines of the set of cluster machines that are neither running one or more tasks of the set of tasks nor storing one or more intermediate data files of a set of intermediate data files, wherein the set of intermediate data files are associated with the set of tasks executing or pending on the set of cluster machines; and
- deactivating each cluster machine of the set of idle cluster machines.

19. A computer program product for allocation, the computer program product being embodied in a non-transitory computer readable storage medium and comprising computer instructions for:
- receiving an indication to deactivate idle cluster machines of a set of cluster machines; and
- determining a set of tasks executing or pending on the set of cluster machines;
- determining a set of idle cluster machines of the set of cluster machines, wherein the set of idle cluster machines comprises all cluster machines of the set of cluster machines that are neither running one or more tasks of the set of tasks nor storing one or more intermediate data files of a set of intermediate data files, wherein the set of intermediate data files are associated with the set of tasks executing or pending on the set of cluster machines; and
- deactivating each cluster machine of the set of idle cluster machines.

* * * * *